April 28, 1964    J. GLASER    3,131,003
GIMBAL MOUNT FOR BEARINGS AND OTHER DEVICES
Filed Oct. 9, 1961
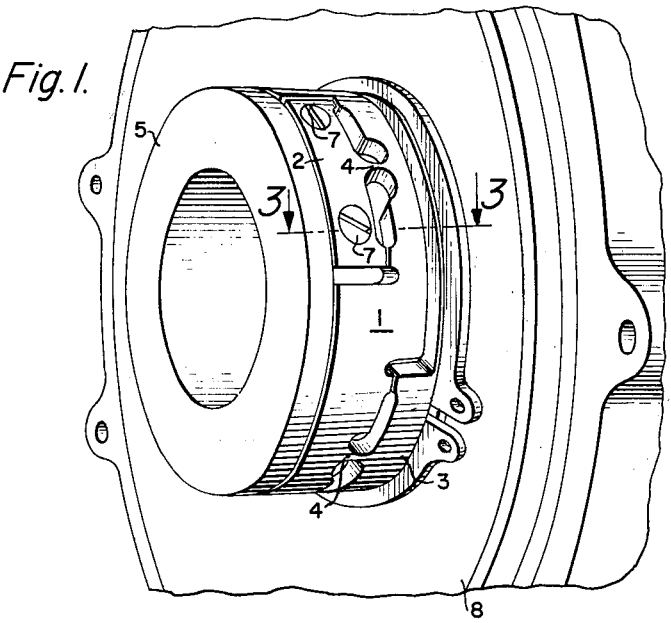
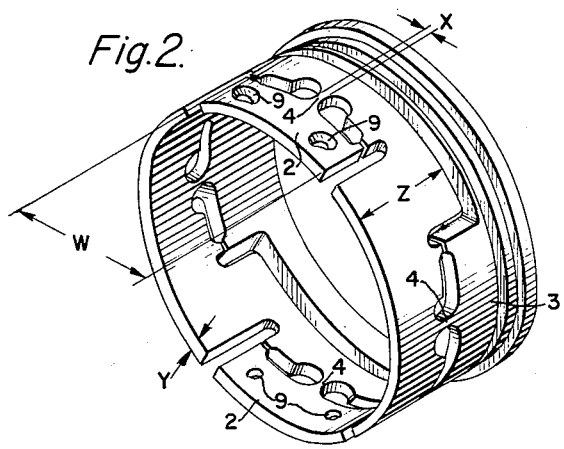
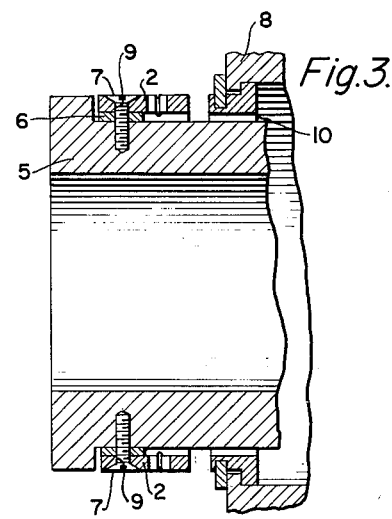
INVENTOR:
JERRY GLASER,
BY Thomas D. Vinton
Attorney.

United States Patent Office 3,131,003
Patented Apr. 28, 1964

3,131,003
GIMBAL MOUNT FOR BEARINGS AND OTHER DEVICES
Jerry Glaser, Los Angeles, Calif., assignor to The Garrett Corporation, Los Angeles, Calif., a corporation of California
Filed Oct. 9, 1961, Ser. No. 143,640
3 Claims. (Cl. 308—22)

This invention relates to a gimbal mount assembly for bearings and the like, and in particular is concerned with a one piece mount assembly having flexibility of movement in planes contiguous to bearing connecting structure so as to facilitate accuracy in bearing alignment.

A gimbal mount made in accordance with this invention may be used, for example, in a gas lubricating assembly where it is necessary to compensate for manufacturing tolerances which could cause bearing misalignment. When mounted by means of this gimbal mount, the bearing is free, within limits, to conform to the shaft journal location, and thus to operate in an optimum position with respect to the shaft journal location.

In this one piece gimbal mount assembly, control of bearing misalignment in axial and radial planes is accomplished by mount assembly members which oppose bearing movement in an axial or radial direction. The mount is designed to be flexible to changes of bearing position in planes which are tangent to the peripheral surface of the mount assembly. In particular, this gimbal mount provides for movement of the bearing assembly in planes which are tangent to the mount flexure points. However, the mount is relatively inflexible to movement in planes which are radial and axial to the bearing assembly. Therefore, this mounting assembly can carry relatively high radial and axial loads with minimum deflection.

Accordingly, an object of this invention is to provide a gimbal mount assembly for bearings or other devices which has the capability of carrying relatively high radial and axial loads with minimum deflection in the mount assembly.

Another object of this invention is a gimbal mount for bearings in accordance with the previous object which provides for flexibility of movement in planes contiguous to the peripheral surface of the mount assembly.

Still another object of this invention is to provide a gimbal mount assembly in accordance with the previous objects which occupies little space and which may be easily fabricated.

Still another object of this invention is to provide a gimbal mount in accordance with the previous objects which is frictionless and thus has excellent durability.

That these and other objects and advantages of the invention are attained will be readily apparent from a consideration of the following description when taken in conjunction with the drawings, in which:

FIG. 1 is a perspective view of the gimbal mount assembly in use;

FIG. 2 is a perspective view of the gimbal mount; and

FIG. 3 is a plan section taken on line 3—3 of FIG. 1.

Referring to FIGS. 1 and 2 of the drawings, there is illustrated a one piece gimbal mount assembly having a cylindrical configuration. Numeral 1 designates the central body or casing member for the amount assembly, having a circular or cylindrical opening along its longitudinal axis for accommodating a bearing member. Numerals 2 and 3 designate lug members projecting longitudinally from the central body member 1. Lug members 2 and 3 project from the central body member 1 by means of arm members 4. Arm members 4 are reduced in width in relation to the width of lug members 2 and 3; i.e., the dimension X is small in relation to the dimension W as shown in FIG. 2. The lug members 2 and 3 project from body member 1 at intervals of 90 degrees around the circumference of body member 1, as shown in FIG. 2. Lug members 2 project from the body member 1 at intervals of 180 degrees. Similarly, lug members 3 project from body member 1 in a longitudinally opposite direction from members 2, at intervals of 180 degrees.

Referring to FIG. 3, it is seen that lug members 2 are connected to a thrust bearing member 5 by means of a connecting member 6. Connecting members 6 are attached to thrust bearing member 5 and to lug members 2 by a plurality of hold-down bolts 7. Bolts 7 are passed through holes 9 in the lug members 2 so as to attach lug members 2 with connection members 6 and bearing member 5.

Lug members 3 are connected to structure such as a housing member 8 by means of a grooved connecting assembly 10 which is an integral part of the lug members 3.

Arm members 4 of the gimbal mount assembly provide flexibility for changes of bearing position in planes tangent to the arm members of the mounting assembly. Radial and axial forces imposed upon the bearing assembly act on the mounting structure through the dimensions Y and Z respectively as shown in FIG. 2. Since dimensions Y thickness and Z casing depth are not reduced on the mount assembly maximum rigidity and resistance to flexure by axial and radial forces is thereby provided.

The gimbal mount assembly is connected to the thrust bearing member 5 and the housing member 8, for example, so that the radial plane transversing the mid-point of arm members 4 is parallel with the radial plane passing through the contacting surface formed between the thrust bearing member and a shaft member. Thus, a maximum degree of flexibility is provided for movement of the bearing assembly in planes tangent to the peripheral surfaces of lug arms 4. In this manner the gimbal mount assembly provides for a mounting assembly which can carry high radial and axial thrust loads with minimum flexure while providing for ease and accuracy of bearing alignment in planes tangent to the lug arm members 4.

It will be apparent to those skilled in the art that the principles of the invention disclosed herein will suggest various other modifications and applications of the same. It is accordingly desired that the present invention shall not be limited to the specific embodiment thereof described herein.

Having thus described my invention, I claim:

1. A gimbal mount for bearings and the like comprising:
   a central body member having a circular opening along its longitudinal axis for accommodating a bearing member and the like;
   at least four lug members projecting axially from and at substantially equal intervals around said central body member, adjacently positioned lug members being arranged to project from said central body member in axially opposite directions, thereby constituting a forwardly projecting set and a backwardly projecting set of lug members, all the lug members in one set being circumferentially spaced from each other;
   arm members connecting each of said lug members to said body member, each of said arm members constituting the sole connection between each said lug member and said body member, each of said arm members being narrower in width but not in thickness than each of said lug members to provide for pivotal movement of each of the lug members but to resist flexure by axial and radial forces;

and means in one set of said lug members for fastening said body member to a structure such as a thrust bearing.

2. A gimbal mount for bearings and the like comprising:

a central body member, said body member having a cylindrical opening along its longitudinal axis for accommodating a bearing member and the like;

four lug members projecting axially from and at intervals of about 90 degrees around said central body member, adjacently positioned lug members being arranged to project from said central body member in axially opposite directions, thereby constituting a forwardly projecting set and a backwardly projecting set of lug members, all the lug members in one set being circumferentially spaced from each other;

arm members connecting each of said lug members to said body member, each of said arm members constituting the sole connection between each said lug member and said body member, each of said arm members having substantially the same radial thickness as and a narrow width relative to said lug members to provide for pivotal movement of each of the lug members but to resist flexure by axial and radial forces;

and bolting means in one set of said lug members for attaching said body member to a structure such as a thrust bearing member.

3. A gimbal mount according to claim 2 wherein all said arm members have their respective mid-points intersected by a single common plane transversely radial to said body member.

References Cited in the file of this patent

UNITED STATES PATENTS

| | | |
|---|---|---|
| 2,159,545 | Bartosch | May 23, 1939 |
| 2,306,048 | Fast | Dec. 22, 1942 |
| 2,424,028 | Haeberlein | July 15, 1947 |
| 2,603,540 | Mierley et al. | July 15, 1952 |
| 2,735,731 | Freebairn | Feb. 21, 1956 |
| 2,966,049 | Ormond | Dec. 27, 1960 |